United States Patent [19]

Eggleston

[11] Patent Number: 4,684,789
[45] Date of Patent: Aug. 4, 1987

[54] THERMOPLASTIC FITTING ELECTRIC WELDING METHOD AND APPARATUS

[75] Inventor: Dean E. Eggleston, Tecumseh, Okla.
[73] Assignee: Central Plastics Company, Shawnee, Okla.
[21] Appl. No.: 853,351
[22] Filed: Apr. 17, 1986
[51] Int. Cl.$^4$ ............................................. H05B 1/02
[52] U.S. Cl. .................................. 219/497; 219/505; 219/535; 219/544; 219/506; 285/292; 285/286; 156/274.2; 156/272.2
[58] Field of Search .............. 219/497, 499, 494, 501, 219/492, 526, 535, 544, 505; 156/272.2, 273.9; 285/292, 284, 286

[56] References Cited

U.S. PATENT DOCUMENTS

| | | | |
|---|---|---|---|
| 4,147,926 | 4/1979 | Stahli | 219/535 |
| 4,334,146 | 6/1982 | Sturm | 219/492 |
| 4,349,219 | 9/1982 | Sturm | 285/21 |
| 4,486,650 | 12/1984 | Bridgstock et al. | 219/544 |
| 4,571,488 | 2/1986 | Reeves | 219/535 |
| 4,602,148 | 7/1986 | Ramsey | 219/535 |

*Primary Examiner*—M. H. Paschall
*Attorney, Agent, or Firm*—Laney, Dougherty, Hessin & Beavers

[57] ABSTRACT

A method and apparatus for electrically heat welding a thermoplastic fitting having an electric resistance heating element disposed therein whereby a regulated quantity of electric power is supplied to the heating element during the welding process and the making of a high quality weld is insured. In accordance with the method, electric power is supplied to the resistance heating element of the fitting. The impedance and optionally, the resistance of the heating element are measured using low voltage electric power and the size of the fitting to be welded is determined therefrom. The initial magnitude of the current flowing through the heating element is sensed and compared with predetermined current levels for the size of fitting to be welded at various temperatures whereby the total time the controlled electric power should be supplied to the heating element of the fitting for the making of a high quality weld is determined. The magnitude of the current flowing through the heating element over the time the controlled electric power is supplied thereto is sensed at predetermined time intervals and compared with predetermined current levels for the size of fitting being welded to thereby insure the welding process is proceeding correctly.

17 Claims, 4 Drawing Figures

THERMOPLASTIC FITTING ELECTRIC WELDING METHOD AND APPARATUS

BACKGROUND OF THE INVENTION

1. Field of the Invention

The present invention relates to thermoplastic fitting electric welding methods and apparatus, and more particularly, but not by way of limitation, to methods and apparatus for electrically heat welding thermoplastic fittings having electric resistance heating elements disposed therein to other plastic members such as plastic pipe joints.

2. Description of the Prior Art

Electric heat weldable fittings formed of thermoplastic material have been developed and used heretofore. Such fittings generally include an electric resistance heating coil or element positioned adjacent the inside surfaces of the fitting which are to be welded to one or more other thermoplastic members such as plastic pipe sections. The electric resistance heating element is usually a coil of resistance wire disposed in the thermoplastic material of the fitting and is connected to electric contacts which are attached to an outside surface of the fitting. Examples of such electric heat weldable thermoplastic fittings are described in U.S. Pat. Nos. 4,147,926, issued Apr. 3, 1979, and 4,349,219, issued Sep. 14, 1982.

In welding the fitting to other plastic members positioned adjacent thereto, a source of electric power is connected to the contacts, such as by electric cable, and electric power is supplied to the resistance heating element of the fitting. The heating element heats the fitting and the adjacent thermoplastic members to temperatures which cause the thermoplastic materials from which the fitting and adjacent members are made to melt whereby they become fused or welded together.

The quality of the weld which results is primarily dependent upon the correct quantity of electric power being supplied to the heating element of the fitting. If too little electric power is supplied, too little heating takes place and an inadequate low strength weld results. If too much electric power is supplied, the fitting and plastic members to which the fitting is welded can be deformed and overheated whereby a good weld does not result. Other factors that affect the quality of the weld produced include heating element abnormalities, e.g., short circuits, poor fitting alignment, poor contact between surfaces to be welded, etc.

Various types of control and electric power generating apparatus have been utilized for supplying the electric power to electric heat weldable thermoplastic fittings. Initially, such apparatus were manually controlled by an operator and the quantity of electric power supplied to the heating elements of the fittings was determined by visual observation of the fittings as they were welded. More recently, control apparatus have been developed whereby the operator manually programs the control apparatus to supply a predetermined quantity of electric power to the heating element of the fitting in accordance with the particular size of the fitting. Also, electric heat weldable fittings having heating coils and separate resistors disposed therein have recently been developed. The values of the resistors are chosen in accordance with the size of the fitting and the electric power to be supplied thereto. Electric power control apparatus that are utilized with such fittings are adapted to sense the values of the resistors and automatically supply a preset quantity of electric power to the heating coil in accordance therewith. Examples of such fittings and control apparatus are described in U.S. Pat. No. 4,486,650, issued Dec. 4, 1984.

While the fittings including separate resistors and the control apparatus which automatically supply the heating coils of the fittings with predetermined quantities of electric power have generally achieved good results, because each of the fittings must include one or more resistors in addition to the resistance heating element disposed therein, they are more expensive to produce than fittings with heating elements alone. In addition, the electric power control apparatus have not included satisfactory provision for preventing the burn-up of fittings and the fire hazard attendant thereto when fittings having shorted-out heating coils are encountered. Also, the predetermined quantities of electric power supplied the fittings have not always been accurate because the temperatures of the fittings have not been taken into account. None of the prior electric control apparatus have been capable of detecting and accounting for defects such as bad electrical connections, misaligned pipe or other similar factors affecting the welding current or temperature.

By the present invention, a method and apparatus for electrically heat welding thermoplastic fittings are provided wherein the fittings do not require separate resistors or other devices for indicating the size of fitting and electric power required. In accordance with the present invention, the size of fitting is determined by impedance and/or quality factor determinations and the entire welding process of each fitting is comparatively monitored to insure the making of a high quality weld.

Summary of the Invention

A method and apparatus for electrically heat welding a thermoplastic fitting having an electric resistance heating element disposed therein are provided. The method comprises the steps of connecting the heating element of the fitting to an electric power source; supplying electric power to the heating element at a minimum voltage level for measuring the impedance and optionally, the resistance of the heating element without significantly heating the element; measuring the impedance and optionally, the resistance of the heating element and thereby determining the size of the fitting to be welded; supplying electric power to the heating element at a controlled voltage whereby the element is heated; sensing the initial magnitude of the current flowing through the heating element and comparing such magnitude and the initial temperature of the element with predetermined current levels for the size of heating element and fitting being welded at various temperatures to thereby determine the total time the controlled electric power should be supplied to the heating element to insure the making of a high quality weld; continuing to sense the magnitude of the current flowing through the heating element over the time the controlled electric power is supplied thereto and comparing such magnitude at predetermined time intervals with predetermined current levels for the size of fitting being welded to thereby determine if the welding process is proceeding abnormally at such time intervals; and terminating the supply of electric power to the heating element of the fitting when it is determined that the welding process is proceeding abnormally or otherwise at the end of the total time required for making a high quality weld.

It is, therefore, a general object of the present invention to provide thermoplastic fitting electric heat welding methods and apparatus.

A further object of the present invention is the provision of a method and apparatus for electrically heat welding thermoplastic fittings having heating elements disposed therein whereby the quantity of electric power supplied to the heating element is automatically determined and accurately controlled.

A further object of the present invention is the provision of a method and apparatus for electrically heat welding thermoplastic fittings wherein the quality of the fitting is determined early in the welding process and the application of electric power to the fitting terminated if such fitting is defective.

Yet a further object of the present invention is the provision of a method and apparatus for electrically heat welding thermoplastic fittings wherein the initial temperature of the fitting is taken into account and the temperature of the heating element is comparatively monitored along with the magnitude of the current flowing therethrough during the welding process to insure a high quality weld.

Other and further objects, features and advantages of the present invention will be readily apparent to those skilled in the art upon a reading of the description of preferred embodiments which follows when taken in conjunction with the accompanying drawings.

Detailed Description of Preferred Embodiments

Figure 1:
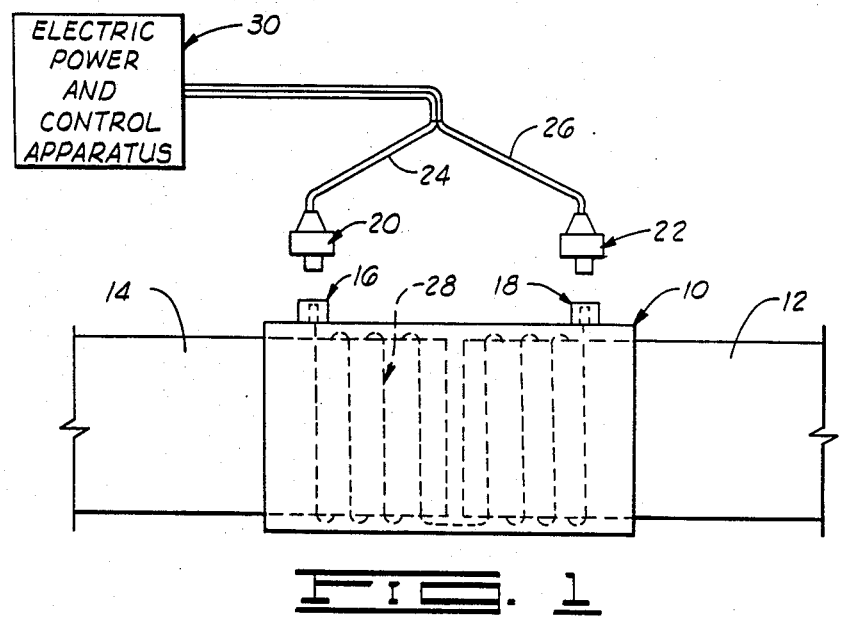
FIG. 1 is a side view of an electric heat weldable thermoplastic sleeve having the ends of a pair of pipe sections inserted therein with the electric power and control apparatus of the present invention illustrated schematically in relation thereto.
Figure 2:
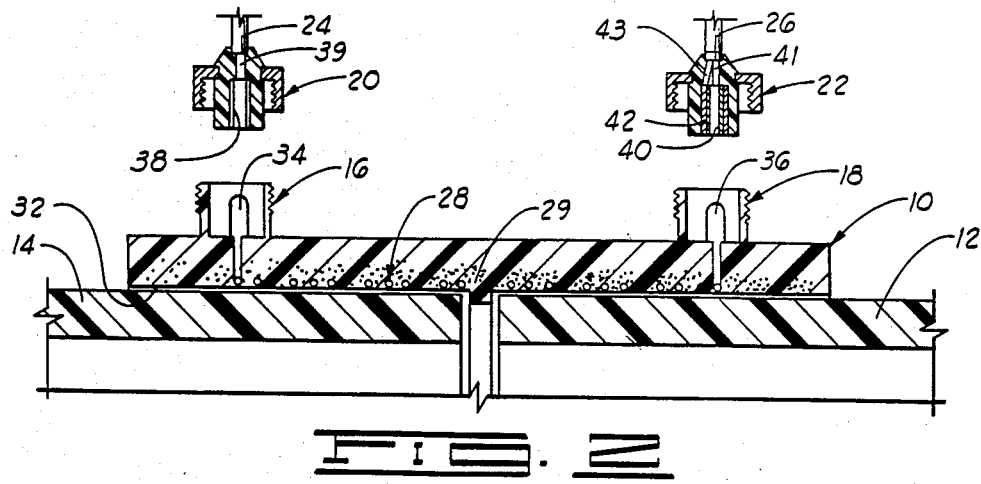
FIG. 2 is an enlarged cross-sectional view of portions of the fitting, plastic pipe sections and electric power and control apparatus of FIG. 1.

Referring now to the drawings and particularly to FIGS. 1 and 2, an electric heat weldable thermoplastic sleeve 10 is illustrated with the ends of a pair of thermoplastic pipe sections 12 and 14 inserted therein. The sleeve 10 includes a pair of electric contact connectors 16 and 18 attached thereto for receiving complementary electric contactors 20 and 22 attached to the ends of electric cables 24 and 26, respectively. The cables 24 and 26 are connected to an electric power and control apparatus, generally designated by the numeral 30, which will be described in detail hereinbelow.

As best shown in FIG. 2, the thermoplastic fitting 10 includes an electric resistance heating element 28 disposed therein adjacent portions of the interior surface 32 thereof. The resistance heating element 28 can take various forms, but preferably is a coil formed of electric resistance heating wire disposed in a spiral winding within the thermoplastic material forming the sleeve 10 adjacent the portions of the interior surface 32 which are to be welded to the exterior surfaces of the pipe sections 12 and 14. The opposite ends of the heating wire 28 are connected to upstanding electric contact pins 34 and 36 disposed within the connectors 16 and 18. As will be understood, the complementary connectors 20 and 22 of the electric power and control apparatus 30 are adapted for removable connection to the connectors 16 and 18 of the sleeve 10.

The connectors 20 and 22 include electric contact sockets 38 and 40, respectively, for engagement with the electric contact pins 34 and 36 of the connectors 16 and 18. The socket contact 38 is connected to a wire 39 extending through the cable 24 and the socket contact 40 is connected to a wire 41 extending through the cable 26. The connector 22 also includes a temperature sensing device 42 such as a thermister, RTD, or thermocouple positioned in heat conducting relationship with the socket contact 40 which is connected to a multiple lead wire 43 also extending through the cable 26. The device 42 senses the temperature of the contact pin 36 when the socket contact 40 is engaged with the pin 36. That is, when the connector 22 is connected to the connector 18 of the sleeve 10, the temperature sensing device 42 senses an initial temperature which is representative of the temperature of the entire sleeve 10 including the heating element 28.

As will be described further hereinbelow, when the fitting 10 is to be fused or welded to the pipe sections 12 and 14, the connectors 20 and 22 attached to the cables 24 and 26 are removably connected to the connectors 16 and 18 of the sleeve 10 whereby an electric circuit is completed between the heating element 28 of the fitting 10 and the electric power and control apparatus 30. The electric power and control apparatus 30 operates in the manner described hereinbelow to provide electric power to the heating element 28 which causes the heating element to heat the thermoplastic material forming the sleeve 10 and the thermoplastic material forming the ends of the pipe sections 12 and 14 inserted within the interior of the sleeve 10. The heating causes the thermoplastic material of the fitting 10 and pipe sections 12 and 14 to melt and fuse together to thereby form welds between the fitting 10 and the pipe sections 12 and 14.

Figure 4:
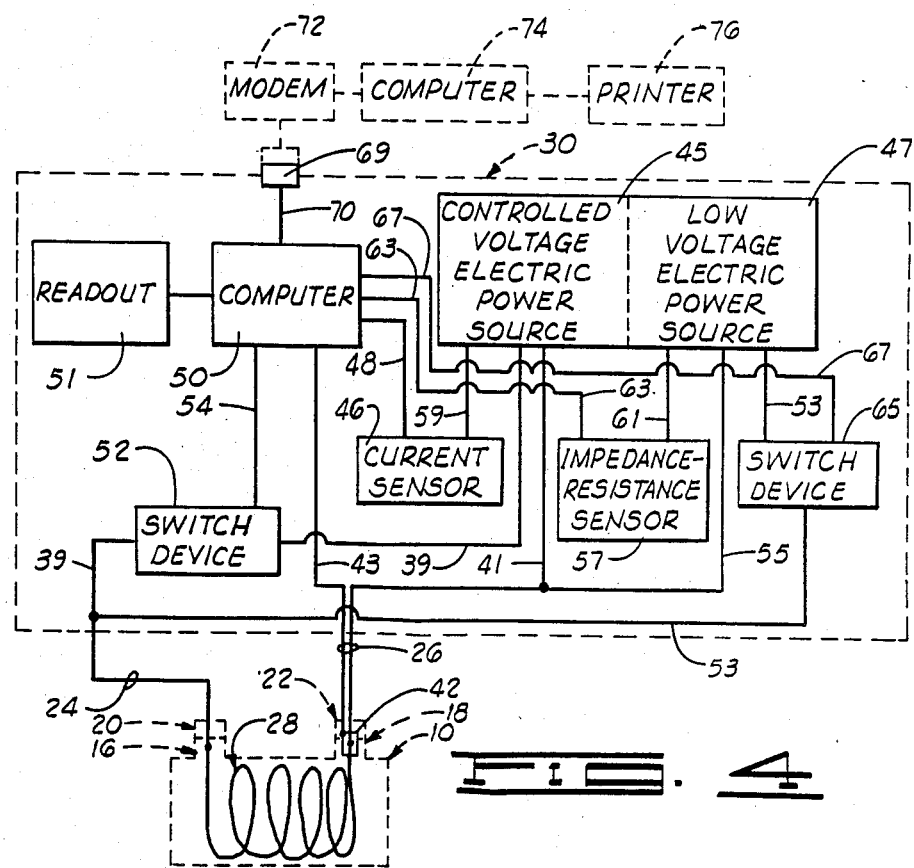
FIG. 4 is a schematic illustration of the electric power and control apparatus of the present invention connected to a thermoplastic fitting having a resistance heating element disposed therein.

Referring now to FIG. 4, the electric power and control apparatus 30 of the present invention is schematically illustrated connected to the heating element 28 of the sleeve 10 by way of the cables 24 and 26 and the connectors 16, 18, 20 and 22. The apparatus 30 includes a controlled voltage electric power source 45 which is connected by means of the wires 39 and 41 extending through the cables 24 and 26 to the contact sockets 38 and 40 of the connectors 20 and 22. A low voltage electric power source 47 is also included in the apparatus 30 which is connected to the wires 39 and 41 by wires 53 and 55, respectively. The contact sockets 38 and 40 of the connectors 20 and 22 are connected to the contact pins 34 and 36 of the connectors 16 and 18 of the sleeve 10 which are in turn connected to the heating element 28 of the fitting 10.

A current sensor 46 for sensing the current flowing from the power source 45 to the heating element 28 is electrically connected to the power source 45 by a lead 59 with the output signal therefrom connected by a lead 48 to an electronic computer 50. An impedance-resistance sensor 57 for sensing the impedance and resistance of the heating element 28 when minimum voltage electric power is applied thereto is electrically connected to the power source 47 by a lead 61 with the output signal therefrom connected to the computer 50 by a lead 63.

The temperature sensing device 42, previously described, is connected by the wire 43 attached thereto and extending through the cable 26 to the computer 50.

A switch device 52 such as a TRIAC or SCR is provided in the circuit between the heating element 28 and the power source 45 which is operably connected to the computer 50 by a lead 54. A similar switch device 65 is provided in the circuit connecting the power source 47 to the wires 39 and 41 which is connected to the computer 50 by a lead 67. The computer 50 includes a read-out module 51 operably connected thereto for visually indicating various modes of operation of the apparatus 30 such as a shut-down due to a defective fitting, etc. Also, the computer 50 is connected to a communication interface 69 by a lead 70 which in turn can be connected to a modem 72, a second computer 74 and a printer 76.

In operation of the apparatus 30 for electrically heat welding the thermoplastic fitting 10 by means of the heating element 28 disposed therein, the connectors 20 and 22 are first connected to the connectors 16 and 18 of the fitting 10. When the apparatus 30 is turned on, the computer 50 first senses the temperature of the heating element 28 and the fitting 10 by way of the temperature sensing device 42 and lead 43. The computer 50 then closes the switch device 65 thereby completing a circuit between the low voltage electric power source 47 and the heating element 28 of the fitting 10 by way of the wires 39, 41, 53 and 55 connected therebetween. The low voltage electric power applied to the heating element 28 is initially alternating current and then direct current at minimum levels sufficient for the sensor 57 to measure the impedance and then the resistance of the element 28 without significantly heating the element. The impedance and resistance values so measured are communicated to the computer 50 by the lead 63 and the computer 50 then opens the switch device 65.

The impedance of the heating element 28 is measured when alternating current at a preselected frequency is applied thereto. The impedance so measured can be used by itself to determine the size of fitting being welded without measuring the direct current resistance. That is, the measured impedance of the heating element 28 can be compared by the computer 50 with predetermined heating element impedances for various sizes of elements and fittings to determine the size for the heating element 28 and fitting 10. Preferably, however, after the impedance of the heating element 28 is measured by the sensor 57, the low voltage electric power supplied to the heating element 28 is changed to direct current and the resistance of the heating element is measured. The measured resistance is used by the computer 50 along with the measured impedance to calculate the quality factor of the heating element 28. The quality factor is determined by dividing the impedance by the resistance, and such factor is compared by the computer 50 to predetermined quality factors for various sizes of heating elements and fittings to determine the size of the heating element 28 and fitting 10 to be welded.

While as stated above, the impedance alone can be used to determine the size of the heating element and fitting to be welded, it is preferred that the computer 50 first determine such size using impedance and then confirm the size using the calculated quality factor for the heating element as described above.

The computer 50 can also confirm the initial temperature sensed by the device 42 using the measured resistance by comparing such resistance with predetermined resistances at various temperatures for the size of heating element and fitting to be welded determined using measured impedance and/or quality factor. The computer 50 next closes the switch device 52 thereby completing a circuit between the controlled voltage electric power source 45 and the heating element 28 by way of the wires 39 and 41 connected therebetween. The computer 50 senses the initial magnitude of the current flowing through the heating element 28 by means of the current sensor 46 and lead 48. The initial temperature of the heating coil 28 and the initial magnitude of the current flowing therethrough can be compared by the computer 50 with predetermined current levels for the size of fitting being welded at various temperatures to again confirm the size of the fitting being welded. The supply of controlled voltage electric power to the element 28 is continued, and the total time such power should be supplied to the element 28 to insure the making of a high quality weld is determined.

Figure 3:
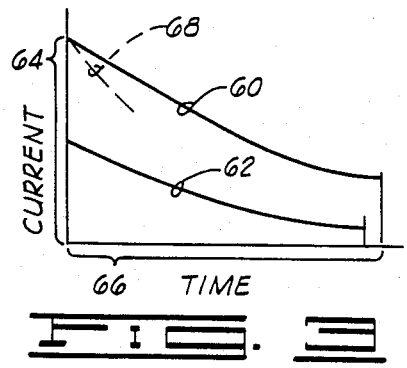
FIG. 3 is a graph showing the current-time relationships of different fittings.

Referring to FIG. 3, the current-time relationship during the making of a high quality weld for two different sizes of fittings using controlled electric power is illustrated graphically. The top curve, designated by the numeral 60, represents the welding process for a two-inch sleeve and the bottom curve, designated by the numeral 62, represents the welding process for a one-inch sleeve. As shown, the current levels are different for the different sizes of sleeve, and each size and type of electrically heat weldable thermoplastic fitting has a current-time relationship which is characteristic of that fitting when a high quality weld is formed using a proper quantity of controlled electric power.

The computer 50 includes such current-time relationship information for a variety of electric heat weldable thermoplastic fittings in the memory thereof whereby the computer 50 can make the comparison described to confirm the size of fitting being welded. The computer also determines the total time the controlled electric power should be supplied to the heating element for the making of a high quality weld from the information in memory and the initial temperature of the fitting. For example, referring to FIG. 3, if the initial magnitude of the current flowing through the heating element of a fitting is that designated by the numeral 64, the computer will confirm that the fitting is a two-inch sleeve represented by the curve 60. The computer will also then determine from the curve 60 that the total time the controlled electric power should be supplied to the heating element for the making of a high quality weld is the time designated by the numeral 66.

The computer 50 continues to sense the magnitude of the current flowing through the heating element of the fitting being welded over the time the controlled electric power is supplied thereto and compares such magnitude at predetermined time intervals with predetermined current levels for the size of fitting being welded, i.e., for the two-inch sleeve of FIG. 3, the computer would compare the actual current level with the current levels of the curve 60 at frequent predetermined time intervals. As long as the sensed current levels are substantially the same as the current levels in memory for the size of fitting being welded, the computer continues the welding process to the total time determined to be required for the making of a high quality weld. If the sensed current levels deviate from the current levels in memory, as for example the deviation shown by the dashed line 68 of FIG. 3, the computer 50 determines the welding process is proceeding abnormally and terminates the welding process by turning off the electric power. The operator of the apparatus 30 is informed of the shutdown and the reason therefor by way of the readout 51.

As long as the welding process proceeds normally, it is allowed to continue to the end of the time determined to be required for the making of a high quality weld whereupon the computer 50 terminates the supply of electric power from the power source 47 to the heating element 28 of the fitting 10 being welded by operation of the switch device 52. Upon terminating the supply of electric power from the source 47, the computer 50 can again cause the resistance of the element 28 to be measured and determine the final temperature thereof.

As will be understood by those skilled in the art, other techniques for applying and controlling the controlled voltage electric power to the heating element of a fitting during the welding process can be utilized. For example, instead of applying electric power at a uniform voltage level to the heating element over the total time of the welding process, the voltage can be controlled at different levels during the welding process in accordance with temperature changes in the heating element and fitting being welded as determined by heating element characteristics during welding, e.g., heating element current flow or heating element resistance measurements made during the welding process. In this technique, the fitting being welded can be preheated to a desired temperature before starting the welding process and prevented from exceeding a predetermined maximum temperature during the process.

In order to facilitate the making of a high quality weld, alternating current is preferably supplied to the heating element of the fitting being welded by the controlled voltage electric power source 45 of the apparatus 30. The frequency of the alternating current is adjusted to that frequency which best causes the fitting being welded to vibrate as a result of the magnetic fields produced by the alternating current flowing through the heating element of the fitting. Such vibration facilitates and promotes the fusing of the softened thermoplastic materials of the fitting and other plastic members being welded thereto.

During and upon completion of the welding process described above, the computer 50 records in its memory the various temperatures, current magnitudes and other variables sensed and determined during the welding process. For example, the computer 50 can record the initial temperature of the heating element and fitting, the size of the fitting, the determined time the constant voltage electric power should be supplied to the fitting, the magnitudes of current flowing over the time constant voltage electric power is supplied to the heating element of the fitting, the final temperature of the heating element, and the total time the constant voltage electric power is supplied to the heating element. Such recorded information can be communicated to a second computer 74 at a remote location by way of the communication interface 69 and a modem 72 connected thereto. The information can be printed by a printer 76 connected to the computer 74 or utilized in any other desired way. If the supply of electric power is terminated as a result of the welding process proceeding abnormally, the nature of the abnormality will be apparent from the recorded information.

Thus, the present invention is well adapted to carry out the objects and attain the ends and advantages mentioned as well as those inherent therein. While presently preferred embodiments of the invention have been described for purposes of this disclosure, numerous changes in the arrangement of steps and parts can be made by those skilled in the art, which changes are encompassed within the spirit of this invention as defined by the appended claims.

What is claimed is:

1. A method of electrically heat welding a thermoplastic fitting having an electric resistance heating element disposed therein whereby a predetermined regulated quantity of electric power is supplied to the heating element during the welding process and the making of a high quality weld is insured comprising the steps of:
    (a) connecting said heating element of said fitting to an electric power source;
    (b) sensing the initial temperature of said heating element and said fitting;
    (c) supplying alternating current electric power to said heating element at a minimum voltage level for measuring the impedance of said element without significantly heating said element;
    (d) measuring the impedance of said heating element;
    (e) determining the size of said element and said fitting by comparing the impedance measured in step (d) with predetermined impedances for various sizes of elements and fittings;
    (f) supplying electric power to said heating element at a controlled voltage whereby said element is heated;
    (g) sensing one or more characteristics of said heating element over the time said controlled voltage electric power is supplied thereto, comparing at least one of said characteristics and said initial temperature of said element and fitting with predetermined characteristics for the size of element and fitting determined in step (e), and comparing at least one of said characteristics at predetermined time intervals with pre-determined characteristics for the size of element and fitting determined in step (e) to thereby control the welding process, determine its duration and determine if the welding process is proceeding abnormally at such time intervals; and
    (h) terminating the supply of electric power to said heating element of said fitting at the duration of said welding process or when it is determined that said welding process is proceeding abnormally in step (g).

2. The method of claim 1 which is further characterized to include the following steps prior to carrying out steps (f) through (h):
    supplying direct current electric power to said heating element at a minimum voltage level for measuring the resistance of said element without significantly heating said element;
    measuring the resistance of said element;
    determining the quality factor of said heating element using said measured resistance and said measured impedance thereof; and
    comparing said determined quality factor with predetermined quality factors for various sizes of elements and fittings to thereby confirm the size of said element and fitting determined in step (e).

3. The method of claim 1 which is further characterized to include the step of recording information relating to said welding process.

4. The method of claim 1 wherein the current of said controlled voltage electric power supplied to said heating element in step (f) is alternating current.

5. The method of claim 4 wherein the frequency of said alternating current is at a level such that said fitting is caused to be vibrated by the magnetic fields produced thereby during said welding.

6. A method of electrically heat welding a thermoplastic fitting having an electric resistance heating element disposed therein whereby a predetermined regulated quantity of electric power is supplied to the heating element during the welding process and the making of a high quality weld is insured comprising the steps of:
   (a) connecting said heating element of said fitting to an electric power source;
   (b) sensing the initial temperature of said heating element and said fitting;
   (c) supplying alternating current electric power to said heating element at a minimum voltage level for measuring the impedance of said element without significantly heating said element;
   (d) measuring the impedance of said
   (e) determining the size of said element and said fitting by comparing the impedance measured in step (d) with predetermined impedances for various sizes of elements and fittings;
   (f) measuring the resistance of said heating element;
   (g) determining the quality factor of said heating element using said impedance measured in step (d) and said resistance measured in step (f);
   (h) comparing said quality factor determined in step (g) with predetermined quality factors for various sizes of elements and fittings to thereby determine the size of said heating element and said fitting to be heat welded;
   (i) supplying electric power to said heating element at a controlled voltage whereby said element is heated;
   (j) sensing the initial magnitude of the current flowing through said heating element and comparing such magnitude and said initial temperature of said element and fitting with predetermined current levels for the size of heating element and fitting determined in step (h) at various temperatures to thereby determine the total time the controlled voltage electric power should be supplied to said heating element of said fitting to insure the making of a high quality weld;
   (k) continuing to sense the magnitude of the current flowing through said heating element over the time said controlled voltage electric power is supplied thereto and comparing such magnitude at predetermined time intervals with predetermined current levels for the size of heating element and fitting determined in step (h) to thereby determine if the welding process is proceeding abnormally at such time intervals; and
   (l) terminating the supply of electric power to said heating element of said fitting when it is determined that said welding process is proceeding abnormally in step (k) or otherwise at the end of the total time required for the making of a high quality weld as determined in accordance with step (j).

7. The method of claim 6 which is further characterized to include the step of recording information relating to said welding process.

8. The method of claim 6 wherein the current of said controlled voltage electric power supplied to said heating element in step (f) is alternating current.

9. The method of claim 8 wherein the frequency of said alternating current is at a level such that said fitting is caused to be vibrated by the magnetic fields produced thereby during said welding.

10. A method of electrically heat welding a thermoplastic fitting having an electric resistance heating element disposed therein whereby a predetermined regulated quantity of electric power is supplied to the heating element during the welding process and the making of a high quality weld is insured comprising the steps of:
   (a) sensing the initial temperature of said heating element and said fitting;
   (b) connecting said heating element of said fitting to an electric power source;
   (c) supplying alternating current electric power to said heating element at a minimum voltage level for measuring the impedance of said element without significantly heating said element;
   (d) measuring the impedance of said heating element;
   (e) supplying direct current electric power to said heating element at a minimum voltage level for measuring the resistance of said element without significantly heating said element;
   (f) measuring the resistance of said heating element;
   (g) determining the quality factor of said heating element using the impedance measured in (d) and the resistance measured in step (f);
   (h) comparing the quality factor determined in step (g) with predetermined quality factors for various sizes of heating elements and fittings to thereby determine the size of heating element and fitting to be welded;
   (i) confirming the sensed initial temperature of said heating element and fitting by comparing the resistance measured in step (f) with predetermined resistances for various temperatures of the size of heating element and fitting determined in step (h);
   (j) supplying electric power to said heating element at a controlled voltage whereby said element is heated;
   (k) sensing the initial magnitude of the current flowing through said heating element and comparing such magnitude and said initial temperature of said element with predetermined current levels for the size of heating element and fitting determined in step (h) at various temperatures to thereby determined the total time the controlled voltage electric power should be supplied to said heating element of said fitting to insure the making of a high quality weld;
   (l) continuing to sense the magnitude of the current flowing through said heating element over the time said controlled electric power is supplied thereto and comparing such magnitude at predetermined time intervals with predetermined current levels for the size of fitting determined in step (h) to thereby determine if the welding process is proceeding abnormally at such time intervals; and
   (m) terminating the supply of electric power to said heating element of said fitting when it is determined that said welding process is proceeding abnormally in step (1) or otherwise at the end of the total time required for the making of a high quality weld as determined in accordance with step (k).

11. The method of claim 10 which is further characterized to include the step of recording information relating to said welding process comprising at least the initial temperature said heating element fitting determined in step (a), the size of fitting and the time electric power should be supplied thereto determined in step (h), the magnitudes of current flowing over the time electric power is supplied to said heating element sensed in step (1), and the total time constant voltage electric power is supplied to said heating element of said fitting.

12. The method of claim 10 wherein the current of said controlled voltage electric power supplied to said heating element of said fitting is alternating current.

13. The method of claim 12 wherein the frequency of said alternating current is at a level such that said fitting is caused to be vibrated by the magnetic fields produced thereby during said welding process.

14. Apparatus for electrically heat welding a thermoplastic fitting having an electric resistance heating element disposed therein connected to a pair of electric contacts attached to said fitting whereby a regulated quantity of electric power is supplied to the heating element during the welding process and the making of a high quality weld is insured comprising:
 (a) first electric power generating means for producing controlled voltage electric power to heat said heating element of said fitting;
 (b) second electric power generating means for producing low voltage electric power for measuring the impedance and resistance of said element without significantly heating said element;
 (c) current sensor means for sensing the magnitude of the current flow from said first electric power generating means electrically connected thereto;
 (d) impedance and resistance sensor means for sensing the magnitude of the impedance and resistance of said heating element electrically connected to said second electric power generating means;
 (e) electric cable means connected to said first and second electric power generating means and adapted for removable connection to said electric contacts of said fitting for conducting electric power to said electric resistance heating element of said fitting;
 (f) switch means electrically connected between said first and second electric power generating means and said cable means; and
 (g) temperature sensing means attached to said cable means and adapted for connection to at least one of said electric contacts of said fitting to thereby sense the temperature of said heating element and said fitting;
 (h) computer means operably connected to said current and temperature sensor means, said impedance and resistance sensor means and said switch means for receiving the impedance and resistance of said heating element and determining the size of said heating element and fitting to be welded therefrom, for receiving and comparing the initial temperature of said heating element and the initial magnitude of the current flowing from said first electric power generating means through said heating element with predetermined temperatures and current levels for the size of fitting to be welded and thereby determining the total time the constant voltage power from said first power generating means should be supplied to said heating element for the making of a high quality weld, for comparing the magnitude of the current flowing through said heating element from said first power generating means at predetermined time intervals with predetermined current levels for the size of fitting being welded to thereby determine if the welding process is proceeding abnormally at such time intervals, for operating said switch means to start and terminate the supply of electric power to said heating element from said first and second electric power generating means, and for operating said switch means to terminate the supply of electric power to said heating element from said first electric power generating means when said welding process is proceeding abnormally or otherwise at the end of the total time determined to be required for the making of a high quality weld.

15. The apparatus of claim 14 wherein said first electric power generating means produces alternating current.

16. The apparatus of claim 14 wherein said second electric power generating means produces alternating current and/or direct current.

17. The apparatus of claim 15 wherein the frequency of said alternating current produced by said first electric power generating means is at a level such that said fitting is vibrated by the magnetic fields produced thereby during said welding process.

* * * * *

UNITED STATES PATENT AND TRADEMARK OFFICE
CERTIFICATE OF CORRECTION

PATENT NO. : 4,684,789

DATED : August 4, 1987

INVENTOR(S) : Dean E. Eggleston

It is certified that error appears in the above-identified patent and that said Letters Patent are hereby corrected as shown below:

Column 9, line 19, after the word "said" add the words and mark of punctuation --heating element;--.

Signed and Sealed this

First Day of December, 1987

Attest:

DONALD J. QUIGG

Attesting Officer

Commissioner of Patents and Trademarks